Figure 5:
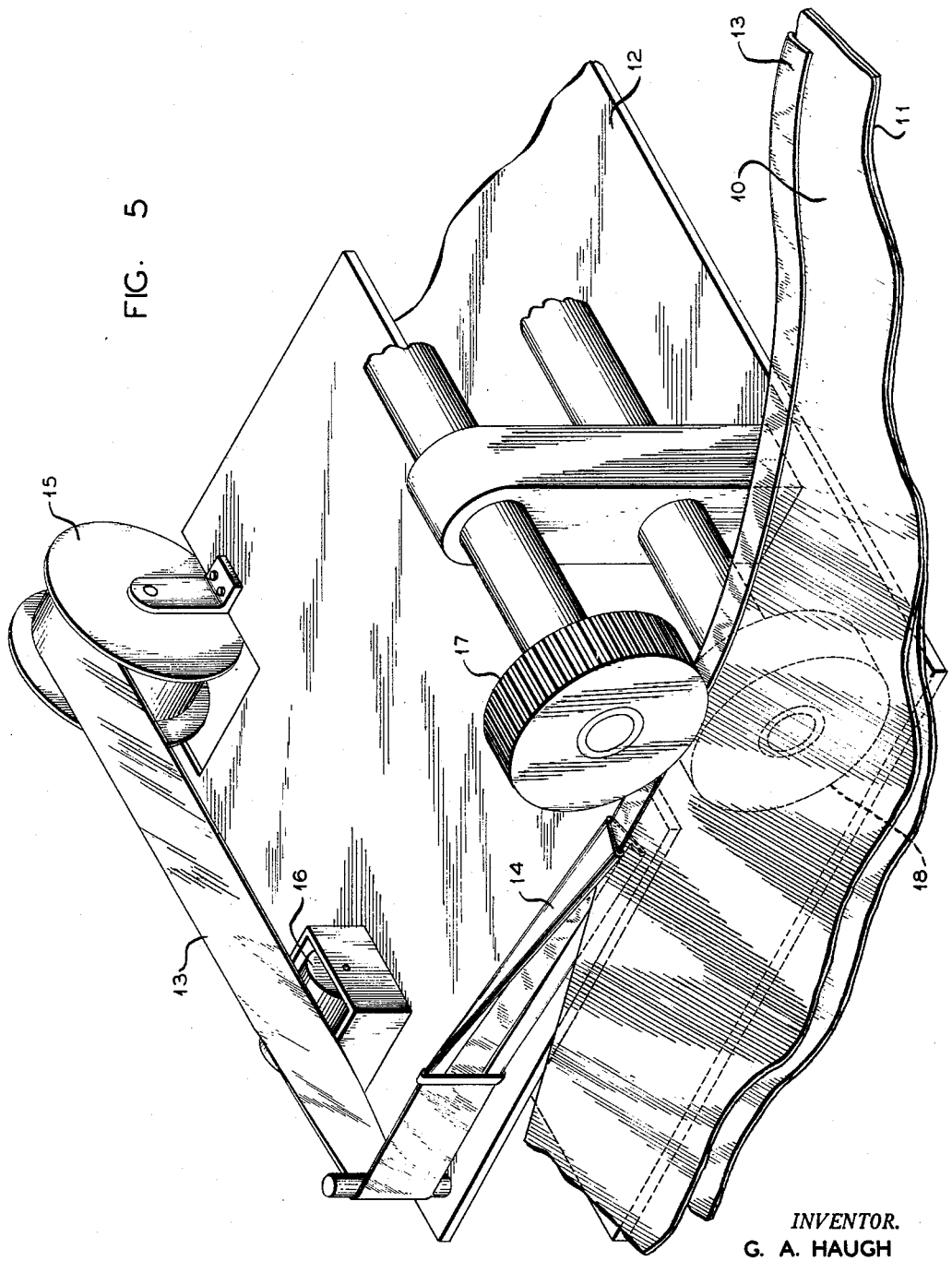

July 26, 1955     G. A. HAUGH     2,713,746
HOLLOW OBJECT AND METHOD OF MAKING THERMOPLASTIC SEAM
Filed March 17, 1950     2 Sheets-Sheet 1
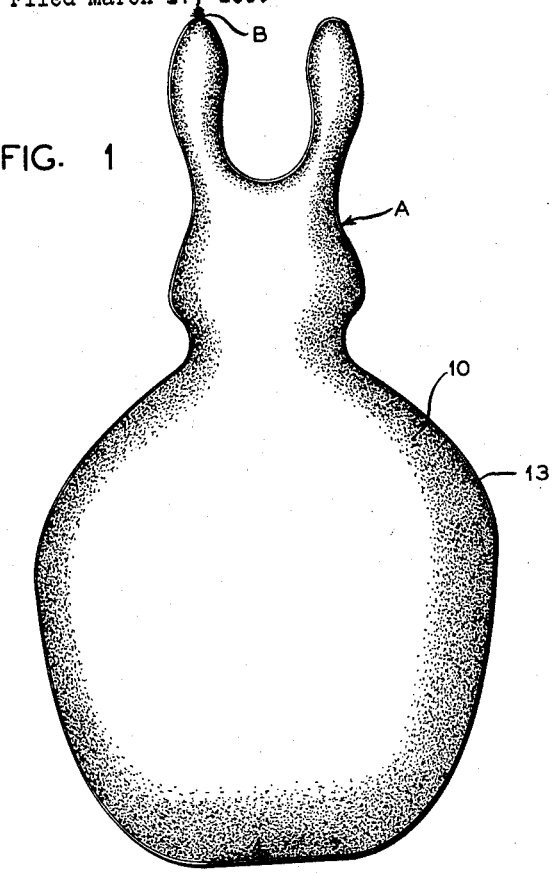
FIG. 1
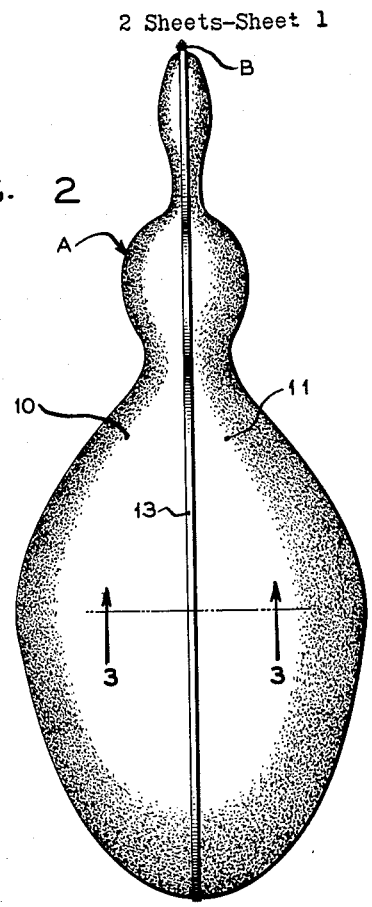
FIG. 2
FIG. 3
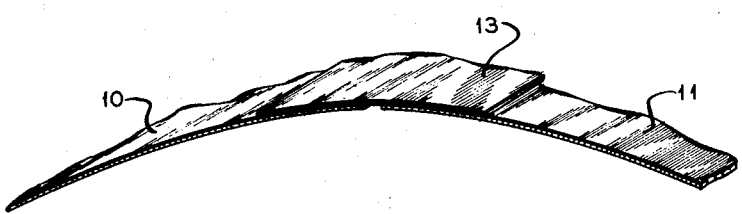
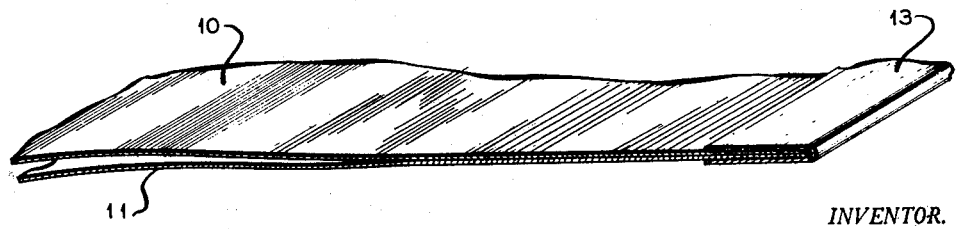
FIG. 4
INVENTOR.
G. A. HAUGH
BY
A. Yates Dowell
ATTORNEY July 26, 1955     G. A. HAUGH     2,713,746
HOLLOW OBJECT AND METHOD OF MAKING THERMOPLASTIC SEAM
Filed March 17, 1950     2 Sheets-Sheet 2

INVENTOR.
G. A. HAUGH
BY
*A. Yates Dowell*
ATTORNEY

United States Patent Office

2,713,746
Patented July 26, 1955

2,713,746
HOLLOW OBJECT AND METHOD OF MAKING THERMOPLASTIC SEAM

Gordon Alexander Haugh, Toronto, Ontario, Canada

Application March 17, 1950, Serial No. 150,180

4 Claims. (Cl. 46—87)

This application is a continuation-in-part of my copending application Serial Number 661,799, filed April 12, 1946 and since abandoned and relates to a seam or joint adapted for use with thermoplastic materials and which is particularly adapted for, although not limited to, a seam for use with a manufactured product which is joined at its edges in order to provide an enclosed space, such as a hollow or inflatable object or the like.

Seams for inflatable objects heretofore have usually been formed by joining the abutting margins of the material directly to each other, resulting in a bead or fin of material projecting from the seam. This does not present a smooth appearance, however, and a seam of this type may be peeled apart relatively easily in comparison to a seam of the type which is the subject matter of this invention.

The seam of the present invention comprises edge portions of sheet material in substantially abutting relationship joined together by a strip overlying the adjoining edge portions. The edge portions are not joined to each other directly, however, and may be separated or flattened to form a substantially continuous sheet, or may be folded at the seam in order that the sheets be placed in facing relationship with each other, if desired.

Heretofore, seams have been employed in which the physical relationship of the component parts is the same as that of the present invention. However, the use of such seam has been limited to articles, or portions thereof, in which the seam could be formed with the edge portions of the sheet members separated or in substantially the same plane.

In the past this has been done by placing the sheets to be joined side by side on a substantially flat surface with the strip overlying the adjoining edge portions and moving a heated roller or the like along the strip. This method is not applicable to a hollow or inflatable object however, as the material of such object opposite the portion being joined interferes with the application of uniform heat and pressure.

As a result of the aforementioned technical difficulties, the use of this efficient seam has heretofore been restricted to non-inflatable objects, such as raincoats and the like, or to objects the seams of which might be formed with the material separated.

Materials which are self-sealing under the influence of heat and pressure are relatively well known and are widely used in trade and industry. Thermoplastic sheet materials, such as rubber hydrochlorides, sold under the trademarks "Pliofilm" and "Koroseal" and of the vinyl family, such as those sold under the trademarks "Vitafilm" and "Vinylite," are well known. These materials are particularly adapted for those uses in which imperviousness to water, air, dust and the like are important requisites. Heretofore, however, the employment of such materials has been restricted in view of the difficulty of joining sheets thereof together, and particularly in forming an enclosed, hollow or inflatable object.

Although the invention contemplates the use of materials of the class set forth heretofore, it should be understood that the invention is limited to those materials free from tackiness at normal atmospheric temperatures and having such thermoplastic cohesive properties that they may be bonded together under the influence of heat and pressure whose value depends on various factors, such as the thickness of the material, the length of time of the application of heat and pressure, and the individual characteristics of the particular material employed, which factors are known to those skilled in the art; the material, furthermore, is limited to those for which there exists a suitable solvent, the various materials and their solvents being known to those skilled in the art. Among the solvents for materials of this general class are cyclo hexanone, methylethylketone and octylacetate.

Accordingly, it is an object of the present invention to provide an inflatable or hollow object of sheet material of the class described having seams which may be easily, quickly, and inexpensively formed and which seams are as strong or stronger than the material itself, the object being substantially impervious to water, air, dust and the like.

Another object of the invention is to provide an improved seam for thermoplastic material of the class described, which is particularly adapted for use with hollow or inflatable objects.

These and other objects of the invention will become apparent from the following description taken in conjunction with the accompanying drawings in which:

Fig. 1 is an elevation of an inflatable object constructed in accordance with the present invention;

Fig. 2, a side elevation of the object of Fig. 1;

Fig. 3, a section, greatly enlarged, on the line 3—3 of Fig. 2;

Fig. 4, a section similar to Fig. 3 illustrating the material with the seam folded; and Fig. 5, a fragmentary perspective illustrating apparatus for producing the seam and the position of the material therewith.

Referring to the drawings, an inflatable object A is shown which is comprised of sheets of material having the characteristics previously disclosed, and referred to by the numerals 10 and 11. For inflating the object a mouthpiece B may be provided at a suitable position. The preferred materials are well-known and include the rubber hydrochlorides, a member of the vinyl family such as a vinyl acetate, or other material having similar physical and chemical characteristics. The material may also be of a different characteristic such as cloth or paper having a coating or being impregnated with thermoplastic material of a character referred to above.

In forming the object A, the sheets 10, 11 of material are positioned in face-to-face or overlying-underlying relationship with the edges to be joined in substantial alignment as shown in Figs. 4 and 5. The sheets are moved along a flat surface 12 with the aligned contiguous edges positioned between the folds of a strip of material 13, the strip material having characteristics similar to that of the sheets. The strip 13 is fed from a roll 15 over a dispenser 16 which applies a coating of solvent to one face of the strip and is moved through the strip former or folder 14 which folds the strip on itself with the opposing faces thereof coated with the solvent.

Emerging from the strip former 14, the strip receives the contiguous edge portions of the sheets 10, 11 and the strip and the edge portions are drawn between heated rollers 17 and 18 which apply heat and pressure to the strip and the material edges. The rollers are maintained at a temperature at which the solvent is particularly effective for bonding or uniting the sheets to the strip with interfacial diffusion and to expedite the evaporation of the solvent. The temperature, however, is below the point at which the material is self-sealing in order that the sheets 10, 11 will not be bonded to each other and will not be weakened as a result of having their temperature raised to that point. After passing through the rollers, therefore, the edge portions of the sheets 10, 11 are bonded to the strip 13 but not directly to each other.

The rollers 17, 18 are normally adjusted to exert a light pressure on the material passing therebetween, such pressure being sufficient to hold the parts in intimate contact during the forming of the joint. As a variation of the normal joint tension may be applied to the strip 13 as it passes through the rollers in order to impart a frilled appearance to the seam.

In forming the inflatable object, the heat and pressure under which strip 13 is bonded to the edges of the sheets 10 and 11 are dependent upon the type of material being treated, its thickness, and the speed of the operation. The method may be applied to any types of materials which are self-sealing under the influence of heat and pressure, for which a suitable solvent exists and the thickness of any one or other of such materials may vary from approximately $1/1000$ inch to $20/1000$ inch. Also, different materials require more or less heat for sealing than others. A still further variant is that of the speed of operation which may vary, for example from 10 feet per minute to 25 feet per minute and above. A still further contributing factor is the type of solvent which is used, and the time required for the solvent to become effective for bonding the parts together.

Although the joint is particularly applicable for use with hollow or inflatable objects it is apparent that the joint may be used for connecting sheets of material having regular as well as irregular outline and whether the material is used to form a hollow or inflatable or other kind of article.

As a specific example of the operation of the method, the aligned edges of two sheets of vinyl acetate were joined by a strip of vinyl acetate coated on one side with cyclo hexanon. The sheets of vinyl acetate were approximately $4/1000$ inch thick, the strip 13 was $4/1000$ inch thick, and sealing was effected at the rate of about 15 feet per minute under a temperature of approximately 150° F. and within the range of from 150° F. to 185° F.

Various modifications may be made in the types of materials used in the process, and the conditions of operation modified to the end that the seam is satisfactory in all respects and the rate of applying is at the maximum. For example, it is not necessary that the sheets 10 and 11 be of the same material; they may be of different materials possessing heat sealing properties, and the strip 13 may be of material different from that of the sheets 10 and 11 which it joins.

It is apparent that the hollow or inflatable object comprising the subject matter of this invention includes a seam which may be easily and quickly fabricated in a single operation, which seam presents a smooth appearance and is particularly resistant to rupture. In addition to the advantages of facility of fabrication, a seam having this physical arrangement not being practically feasible heretofore in a hollow or inflatable object, the material of the seam retains its inherent strength and is not weakened by being subjected to temperatures of an order sufficient to produce self-sealing without the use of a solvent.

It will be understood, of course, that modifications may be made in the preferred embodiments of the invention described and illustrated herein without departing from the scope of the invention as defined by the appended claims.

What is claimed is:

1. The method of forming a hollow article from sheets of thermoplastic material having self-sealing properties under the influence of heat and pressure comprising stacking the sheets so that the faces of the sheets adjacent the edges to be joined are aligned in overlying-underlying relationship, applying a solvent to one side of a strip of similar thermoplastic material, folding the strip over on itself with the solvent applied to the opposing faces of the one side of the strip, positioning the aligned faces between the opposing faces of the strip, and applying heat and pressure thereto of a degree such that the materials themselves are not self-sealing but at which the solvent is effective to bond the coated faces of the strip to the opposing faces of the aligned edges.

2. As an article of manufacture, a hollow object comprising one or more sheets of thermoplastic material of the type which forms a permanent bond when two layers are pressed firmly together at a sufficiently high temperature but which is not tacky in its natural state at normal atmospheric temperatures, said object having adjacent substantially parallel edge portions of the sheets spaced apart and joined by thermoplastic strip material which is permanently bonded to the adjacent edge portions along the length thereof, said adjacent edge portions forming a substantially uniplanar surface when separated.

3. The method of joining sheet material which is free from tackiness at normal atmospheric temperatures and which has such thermoplastic cohesive properties that it may be bonded together under the influence of particular heat and pressure, comprising stacking the sheets such that the faces of the sheets adjacent the edges to be joined are aligned in overlying-underlying relationship, applying a solvent to one face of a strip of sheet material which is free from tackiness at normal atmospheric temperatures and has thermoplastic cohesive properties similar to that of the stacked sheets, the solvent having such properties as to render the sheet material which it contacts tacky at normal atmospheric temperatures, folding the strip over on itself with the solvent applied to the opposing faces, positioning the aligned faces between the opposing faces of the strip and sealing the coated strip to the aligned faces of the material which the coated portion of the strip contacts by the application of pressure sufficient, at a temperature below the temperature causing bonding of the uncoated aligned faces to bond the coated faces of the strip to the opposing aligned faces of the sheet material, whereby the sheets are bonded to the strip but not directly to each other.

4. The method of joining substantially parallel edges of a pair of sheets of material having self-sealing properties under the influence of particular heat and pressure comprising stacking the sheets such that the faces of the sheets adjacent the edges to be joined are aligned in overlying-underlying relationship, applying a solvent to one face of a strip of heat sealable material, folding the strip over on itself with the solvent applied to the opposing faces of the strip, positioning the aligned faces between the opposing faces of the strip, and applying heat and pressure thereto of a degree such that the materials themselves are not selfsealing but at which the solvent is effective to bond the coated faces of the strip to the opposing faces of the aligned edges.

References Cited in the file of this patent

UNITED STATES PATENTS

| | | |
|---|---|---|
| 634,302 | Longden | Oct. 3, 1899 |
| 1,504,079 | Roberts | Aug. 5, 1924 |
| 1,668,782 | Roberts | May 8, 1928 |
| 2,146,308 | Maxfield | Feb. 7, 1939 |
| 2,330,855 | Woolf | Oct. 5, 1943 |
| 2,343,975 | Hosfield | Mar. 14, 1944 |
| 2,367,725 | Lindh et al. | Jan. 23, 1945 |
| 2,373,744 | Coghill | Apr. 17, 1945 |
| 2,392,695 | Rohdin | Jan. 8, 1946 |
| 2,444,150 | Best | June 29, 1948 |
| 2,470,990 | Kennedy | May 24, 1949 |